United States Patent [19]
Larsen

[11] 3,790,326
[45] Feb. 5, 1974

[54] EXTRUSION APPARATUS
[75] Inventor: Ronald L. Larsen, Minneapolis, Minn.
[73] Assignee: Conwed Corporation, St. Paul, Minn.
[22] Filed: Nov. 26, 1971
[21] Appl. No.: 202,451

Related U.S. Application Data
[62] Division of Ser. No. 47,755, June 19, 1970.

[52] U.S. Cl.............. 425/325, 425/224, 425/340, 425/394, 425/461, 264/176, 264/210
[51] Int. Cl............................................. B29d 7/02
[58] Field of Search.... 264/176, 210, 175; 425/325, 425/71, 328, 72, 385, 224, 461, 363, 175, 340

[56] References Cited
UNITED STATES PATENTS
1,603,812   10/1926   Stein .............................. 264/175 X
2,075,735   3/1937    Loomie............................ 425/72 X
3,526,927   9/1970    Villain ............................... 425/71
3,543,333   12/1970   Anders et al. ..................... 425/141
2,715,256   8/1955    Siegrist ............................ 425/461
2,804,651   9/1957    Peterson ...................... 425/461 X
2,791,801   5/1957    Szantoy........................... 425/72 X
3,504,075   3/1970    Williams ........................... 264/175

Primary Examiner—Robert L. Spicer, Jr.
Attorney, Agent, or Firm—Eyre, Mann & Lucas

[57]  ABSTRACT

An apparatus is provided for the extrusion of polymer products from a pool of molten polymer. The apparatus is comprised of at least two movable die members between which the polymer is extruded. The moveable die members apply pressure to the surface of the extruding sheet to spread and smooth out gauge variations in the extruded product to reduce the visual effects of the gauge variations on the extruded sheet.

8 Claims, 5 Drawing Figures

PATENTED FEB 5 1974 3,790,326
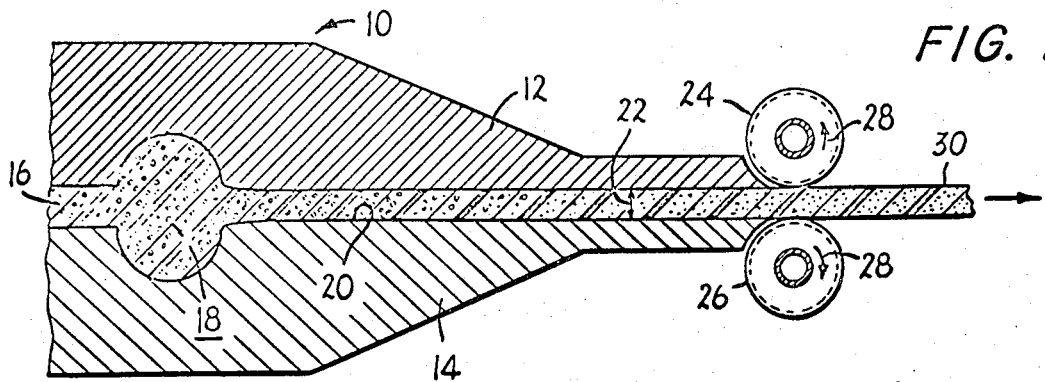
FIG. 1
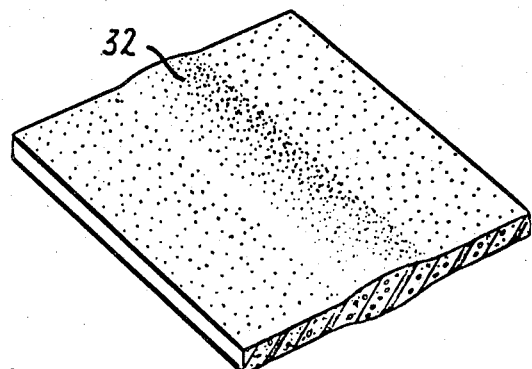
FIG. 2
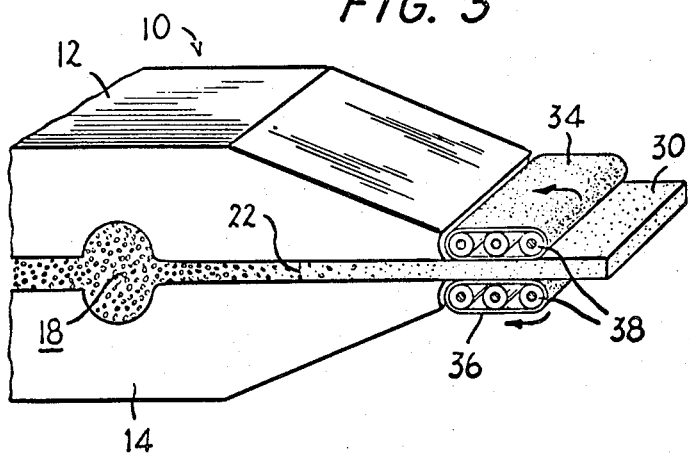
FIG. 3
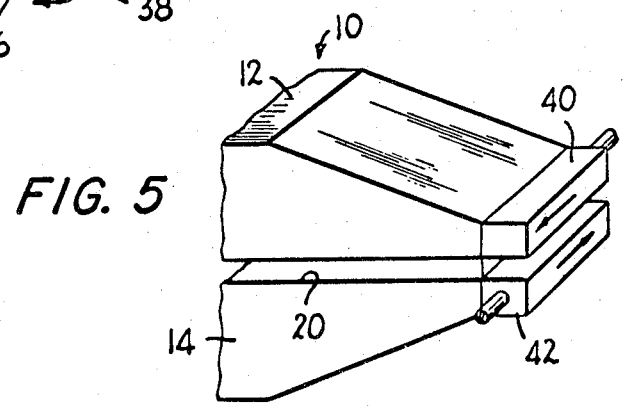
FIG. 5
FIG. 4

EXTRUSION APPARATUS

This application is a division of Ser. No. 47,755, filed June 19, 1970.

This invention relates to method and apparatus for the extrusion of polymer products and more particularly to apparatus and method for producing a sheet of polymer in which gauge variations on the sheet are controlled.

In accordance with the present invention, two or more relatively moveable die members are provided between which molten polymer under pressure is extruded. Each of the moveable die members is adapted to move on and resist the pressure force of the surface of the extruding sheet while the sheet is still molten polymer to reduce the variations in sheet planar thickness or gauge variations normally caused by variations in the die member lands to maintain uniform sheet thickness only within the pressure force limits. Conventional extrusion apparatuses generally provide two stationary die members for the extrusion of a sheet of polymer. Any irregularities in the die lands of the conventional apparatus will appear as a high or low spot or ridge on the extruded sheet of polymer. These irregularities on the surface of the sheet appear in a rather constant position on the surface thereof which makes the sheet appear wavy, especially when the sheet is wound up on a roll. By extruding sheet between relatively moveable die members as provided for in the instant invention, these irregularities or gauge variations will be spread across the sheet or smoothed out to give the sheet a much more uniform appearance.

It has been found that for best results, only a portion of the die members are made moveable on the surface of the sheet. By reducing the moving surface area in contact with the polymer sheet, the shear stress applied to the extruding polymer is reduced. To achieve this beneficial reduction in shear stress, the die members are provided with moveable die lips between which the sheet is extruded and the remaining portion of the die members are not moved on the surface of the sheet. The die lips or die members as the case may be may be moved at any speed but preferably they are moved at the extrusion speed to prevent the moveable die lips from interfering with the extrusion process. Of course, the die members or the die lips may be moved faster or slower than the extrusion speed to give the sheet various decorative effects if this is desired. Although in most cases the die members on either side of an extruding sheet will be made moveable to control gauge variations on both sides of the sheet, only one die member need be made moveable if control of gauge variations on only one side of the sheet is desired.

For best results, the die members are moved on the surface of the extruding sheet either in the direction of extrusion or transverse thereto to prevent unduly increasing the pressure necessary for extrusion. Also for best results, the moveable die lips are heated to a temperature equal to the melt temperature of the polymer being extruded so that gauge variations in the sheet may be easily smoothed down by the moving die lips.

Of course, the die members may be moved in conventional manner to increase or decrease the space between die members to produce a different thickness sheet.

The moveable die lips of the instant invention may be provided with surface designs thereon or with means for cutting into the sheet to produce a particular pattern effect. Depending on the type of pattern desired, the die lips will be heated either below or above the polymer melt temperature. For instance, if the surface of the film is to be continuously cut, a temperature equal to or higher than the melt temperature will be used to facilitate the easy removal of polymer from the sheet. If a pattern is to be impressed into the sheet, a temperature equal to and preferably below the melt temperature will be used to prevent polymer form flowing back into the impressed design and to prevent the compressed polymer from springing back to its original shape. It is well within the skill of the art to determine the particular temperature necessary to properly impress or cut any design into the surface of the sheet being extruded.

Referring now to the drawings wherein various preferred embodiments of the invention are depicted and wherein like numerals refer to like parts:

FIG. 1 is a side sectional view of one embodiment of the apparatus made in accordance with the instant invention.

FIG. 2 is an isometric schematic view of a sheet extruded by an apparatus without the moveable die members of the instant invention.

FIG. 3 is a side view of another embodiment of an apparatus made in accordance with the present invention.

FIG. 4 is a side view of still another embodiment of an apparatus made in accordance with the present invention.

FIG. 5 is yet another embodiment of an apparatus made in accordance with the present invention.

Referring now to FIG. 1, there is seen an extrusion die 10 which is comprised of two die members 12 and 14. Die members 12 and 14 receive polymer from a conventional screw extruder (not shown) through channel 16 which channel terminates in a flow regulating manifold 18. Manifold 18 spreads the polymer into a uniform flow across the entire land area 20 of the die members.

Mounted at the end of die members 12 and 14 are a pair of moveable rolls 24 and 26 respectively. Rolls 24 and 26 are spaced apart a distance equal to the distance between lands 20 as indicated by arrow 22 and it is through these moveable rolls that the sheet of polymer such as polypropylene is extruded. The rolls 24 and 26 are rotated by conventional means (not shown) such as a standard torque motor in the direction of the arrows 28 in FIG. 1. For best results, the direction of rotation of the rolls 24, 26 coincides with the direction of extrusion to avoid the application of shear forces on the extruded polymer in a direction opposite to extrusion. The rolls need not be motor driven although best results are achieved when the rolls are motor driven since the speed of rotation can then be controlled and adjusted as desired for the operation at hand. If there is no motor drive, movement of the extruded polymer product between the rolls causes rotation thereof. Conventional means such as an adjusting screw (not shown) may be provided to vary the distance 22 between the die members.

Polymer sheet 30 extruded from between die members 12 and 14 will tend to have gauge variations or banding thereon as shown at 32 in FIG. 2. Numeral 32 represents a raised band of polymer in the extrusion direction which results from imperfections in die construction or imperfect adjustment of the die lips or the gauge variations may result from an imbalance in the extrusion system which tends to occur from time to time. As the sheet passes between rolls 24 and 26, the imperfections are varied by rotation of the rolls to avoid a continuous band in one location. In the case of intermittent gauge variations, the moveable rolls will tend to move these in the extrusion direction to smooth out the high spots in the sheet. When the sheet is wound up on a roll, the sheet will not appear as wavy as it will when the high spots have not been reduced in accordance with the present invention. For best results, the rolls are heated by conventional means (not shown) which may take the form of electric wires in the rolls or by a supply of hot oil to the interior of the rolls. Conventional thermostat means (not shown) may be used to control the temperature of the rolls 24 and 26.

The apparatus depicted in FIG. 3 is exactly the same as that depicted in FIG. 1 except that the moveable rolls 24 and 26 are replaced by a pair of endless rotating belts 34 and 36. These endless belts are mounted for rotation on a plurality of rollers 38 which may be driven by conventional means (not shown). The belts 34, 36 may be made of steel or any relatively still material capable of withstanding the high temperature of the extruded polymer and of resisting pressure of the melted polymer to change and spread the gauge variations appearing in the sheet.

The apparatus depicted in FIG. 4 is essentially the same as that shown in FIG. 3 except that the belts 34 and 36 rotate in a direction transverse to the direction of extrusion. Moving the belts in a direction transverse to the direction of extrusion tends to spread gauge variations on the sheet across the complete width of the sheet thus providing for a much more uniform appearing thickness sheet.

The apparatus depicted in FIG. 5 is essentialy the same as that shown in FIG. 4 except that the rotating die lips have been replaced by reciprocating bars 40, 42. The reciprocating bars move in opposite directions to each other and apply a cntinous force to the surface of the extruded sheet substantially to remove the gauge variations transversely across the sheet.

In all of the embodiments shown, the moveable lips may have a design impressed thereon which design is imparted to the extruded sheet. In addition, only one moving member may be used and the die lip on the member opposite the die member containing the moveable member may be extended to support the sheet until the sheet has been extruded from between the moveable lip and the land of the extended die member.

It is intended to cover all modifications of the embodiments herein chosen for the purposes of illustration which do not constitute departures from the spirit and scope of the invention.

What is claimed is:

1. An apparatus for controlling gauge variations on a sheet of polymer comprising:
   a. two die members approximately uniformly spaced apart over a substantial length thereof for forming melt extrusion of a desired gauge sheet of molten polymer;
   b. two spaced heated, continuously moving members disposed immediately adjacent the uniformly spaced length of the die members, each of which is immediately adjacent one of said uniformly spaced die members;
   c. the space between the continuously moving members being essentially equal to the uniform space between the die members;
   d. the continuously moving members being disposed to contact and act on the sheet surface of the sheet of polymer while it is still molten from extrusion and before it has set to reduce the variations in the sheet planar surface to maintain uniform sheet thickness only within the moving members limit; and
   e. the temperature of the contacting surface of said continuously moving members being approximately equal to the temperature of the molten polymer sheet.

2. The apparatus of claim 1 wherein the continuously moving members move in the direction of extrusion.

3. The apparatus of claim 2 wherein the continuously moving members are rolls.

4. The apparatus of claim 2 wherein the continuously moving members are belts.

5. The apparatus of claim 2 wherein the continuously moving member is moved at the same rate as the speed of extrusion of the polymer sheet.

6. The apparatus of claim 1 wherein the continuously moving members move in a direction transverse to the direction of extrusion.

7. The apparatus of claim 6 wherein the continuously moving members are belts.

8. The apparatus of claim 6 wherein the continuously moving members are bars.

* * * * *